UNITED STATES PATENT OFFICE.

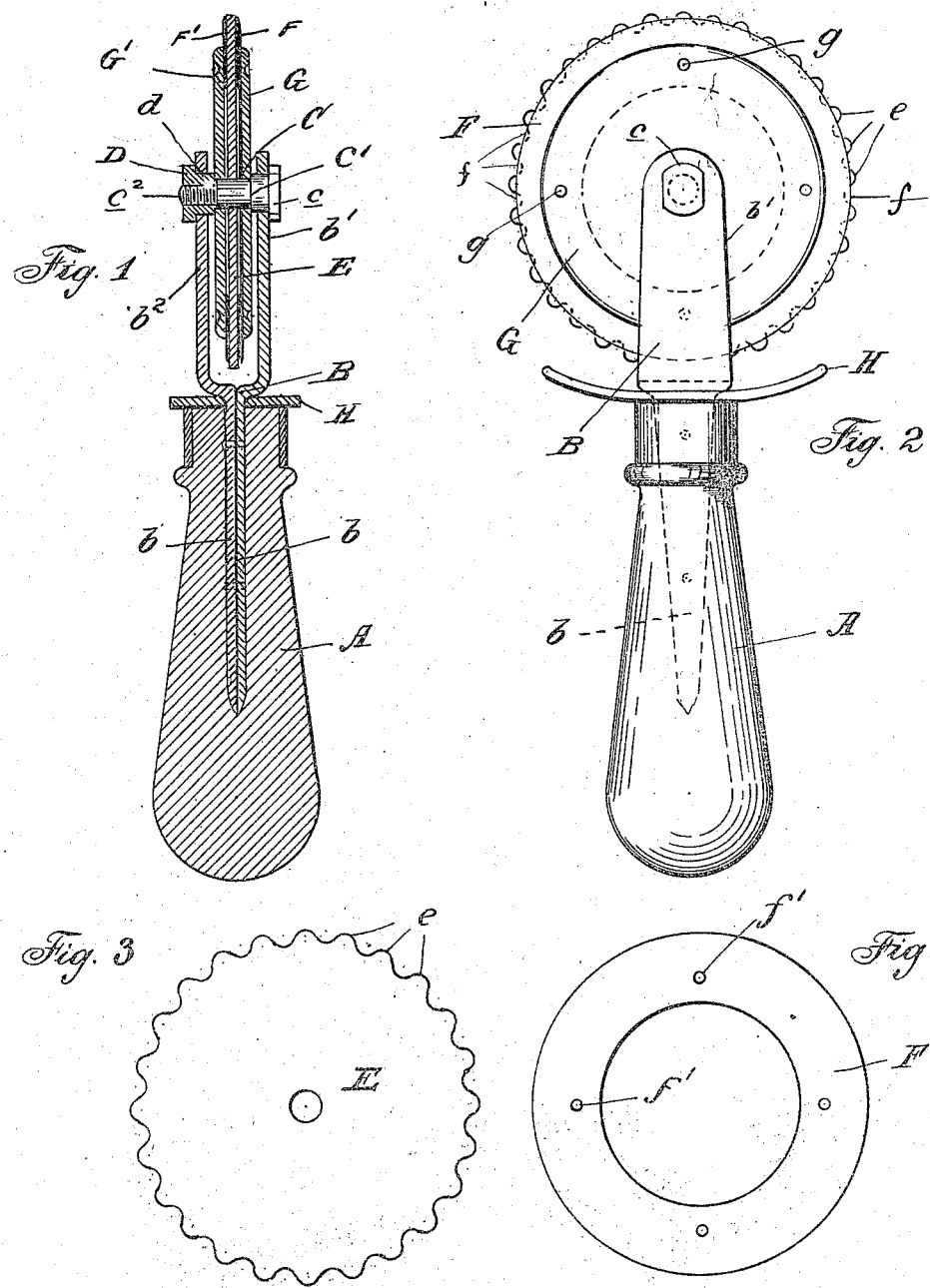

JOSEPH F. NICOLAS, OF CHICAGO, ILLINOIS.

SKINNING DEVICE.

No. 900,300.

Specification of Letters Patent.

Patented Oct. 6, 1908.

Application filed October 24, 1907. Serial No. 398,884.

*To all whom it may concern:*

Be it known that I, JOSEPH F. NICOLAS, a citizen of the United States, and a resident of Chicago, in the county of Cook and State of Illinois, have invented a new and useful Improvement in Skinning Devices, of which the following is a complete specification.

This invention relates to improvements in skinning devices and more particularly to a skinning device adapted for removing the hides from cattle or the like.

Heretofore the hides have usually been removed by means of an ordinary knife and a great deal of skill is required of the operator to prevent cutting the hide and thus damaging it, or cutting the flesh and injuring its appearance. Furthermore when using an ordinary knife the operator is enabled to cut but in one direction, usually towards himself, so that at the outward movement of the arm nothing is accomplished.

The object of this invention is to provide a skinning device adapted to entirely do away with the danger of injuring either the hide or the flesh by cutting, and which may be operated in either direction, that is at both the outward and inward thrust of the operator's arm.

It is a further object of the invention to provide a very cheap and simple device having a rotary cutter thereon adapted to travel in either direction and which is adapted to be rotated along the union between the hide and the flesh and separate the two.

The invention consists of the matters hereinafter described in the specification and more fully pointed out and defined in the appended claims.

In the drawings: Figure 1 is a central, longitudinal section of a device embodying my invention. Fig. 2 is a side elevation of the same. Fig. 3 is a side elevation of the serrated plate. Fig. 4 is a side elevation of one of the annular knives.

As shown in said drawings: A indicates a handle of any preferred material, as for instance wood, and B indicates a fork which may be of any preferred construction and material, but which as shown, comprises two strips of metal, the ends $b$ of which are tapered and rigidly engaged together by riveting or in any other preferred manner, and are rigidly engaged in a suitable socket in the end of the handle. The other ends $b'$ and $b^2$ form the prongs of the fork and are bent outwardly adjacent the end of the handle, and then inwardly to bring the prongs into parallel relation but spaced a distance apart. Said prongs are apertured at their ends and a bolt or axle C is journaled therein. Said axle is provided with a head $c$ adapted to engage against the prong $b'$, and from a point slightly beyond the inner face of said prong is reduced in size to provide a shoulder $c'$. The opposite end $c^2$ of said axle is still further reduced in size and is screw threaded, and engaged thereon is a nut D which engages against the outer face of the prong $b^2$ and is provided with a cylindrical portion $d$ projecting through said prong. Engaged on said axle is the cutter which comprises the central serrated plate E, the knives F—F', and the retaining plates G—G'.

The serrated plate E is provided on its periphery with a plurality of teeth $e$ which may be of any preferred shape but which, as shown, are rounded and are adapted to be forced between the hide and the flesh. The knives F and F' are situated on each side of the serrated plate and are of slightly less diameter than the same, so that portions $f$ of their edges between said teeth and alternating therewith are exposed, as shown more clearly in Fig. 2. Said knives as shown are annular in shape and are provided with very thin edges on their peripheries, and each is provided with a plurality of apertures $f'$ therethrough. The retaining plates G and G' are of less diameter than said knives and are provided with indentations $g$ which enter the apertures $f'$ in said knives and hold the knives in place. The combined thickness of the parts forming the cutter is such that it fits closely between the shoulder $c'$ and the nut D so that sufficient compression of the parts may be secured to hold them in their proper positions. A guard or shield H is engaged on the handle beneath the prongs of the fork and acts to protect the hand of the operator from injury.

In operation the tool is held in the hand of the operator and the edge of the cutter rolled along the point of union between the hide and the flesh. The teeth on the plate E are forced in between the hide and the flesh, and the knife edges between the teeth act to cut away the tissues, but the portions of the exposed edges of the knives are so short that the danger of cutting either the flesh or the hide is entirely obviated.

I claim as my invention:

1. In a device of the class described the combination with a handle of a fork thereon, a rotary cutter on said fork having alternating teeth and cutting edges and retaining plates of less diameter than said cutter clamping it on either side.

2. In a device of the class described the combination with a handle of a rotary plate thereon having teeth on its periphery, and means rigidly engaged on either side of said plate and affording cutting edges alternating with said teeth.

3. In a device of the class described the combination with a handle of a fork thereon, an axle journaled in said fork, a serrated plate on said axle and an annular knife engaged on each side of said plate.

4. In a device of the class described the combination with a handle of a fork thereon, an axle journaled in said fork, a serrated plate on said axle, and a knife engaged on each side of said plate and having their edges exposed between its serrations.

5. In a device of the class described the combination with a handle of a fork thereon, an axle journaled on said fork and having a shoulder near one end thereof, a central, toothed plate on said axle, an annular knife on each side of said plate having their edges partially overlapping said teeth, a retaining plate against each knife, one of which abuts against said shoulder, and a nut on the other end of said axle adapted to abut against the other retaining plate and hold the knives firmly in place.

6. In a device of the class described the combination with a handle of means affording bearings thereon, an axle journaled in said bearings, a pair of annular knives on said axle, a plate between said knives and having teeth projecting slightly beyond the edges of the knives, and retaining plates adapted to hold said knives in position.

7. In a device of the class described the combination with a handle of an axle journaled therein, a pair of annular knives on said axle, a plate between said knives having teeth on its periphery projecting slightly from between the edges of said knives, retaining plates on the axle adapted to hold said knives in place and a guard on the handle below said knives.

In testimony whereof I have hereunto subscribed my name in the presence of two witnesses.

JOSEPH F. NICOLAS.

Witnesses:
H. R. WEIGH,
HANS PABST.